United States Patent [19]

De Cloet

[11] Patent Number: 4,530,203
[45] Date of Patent: Jul. 23, 1985

[54] LEAF DISTRIBUTION MEANS

[75] Inventor: Ben De Cloet, Tillsonburg, Canada

[73] Assignee: De Cloet Ltd., Ontario, Canada

[21] Appl. No.: 504,884

[22] Filed: Jun. 16, 1983

[30] Foreign Application Priority Data

Mar. 9, 1983 [CA] Canada ................. 423225

[51] Int. Cl.³ .......................... A01D 45/16
[52] U.S. Cl. ........................ 56/27.5; 56/16.6;
414/293; 414/300
[58] Field of Search .......... 56/13.2, 16.6, 27.5;
198/638, 639, 640, 641, 642; 414/25, 26, 293,
294, 299, 300, 301; 29/DIG. 78

[56] References Cited

U.S. PATENT DOCUMENTS

| 628,144 | 7/1899 | Groven | 414/25 |
|---|---|---|---|
| 971,436 | 9/1910 | Funk | 198/642 |
| 2,849,118 | 8/1958 | Ashton | 130/27 HF |
| 3,095,230 | 6/1963 | Long | 56/27.5 |
| 3,143,370 | 8/1964 | Danforth et al. | 56/27.5 |
| 3,184,904 | 5/1965 | Fiedler | 56/126 |
| 3,599,404 | 8/1971 | Fernandez et al. | 56/14.5 |
| 3,654,753 | 4/1972 | Gervais | 56/27.5 |
| 3,834,137 | 9/1974 | Long | 56/27.5 |
| 3,885,376 | 5/1975 | Johnson | 56/27.5 |
| 3,902,304 | 9/1975 | Mitchell et al. | 56/27.5 |
| 3,935,959 | 2/1976 | Long | 56/27.5 |
| 3,946,542 | 3/1976 | Long | 56/27.5 |
| 4,016,985 | 4/1977 | Green et al. | 56/27.5 |
| 4,037,391 | 7/1977 | Mitchell et al. | 56/27.5 |
| 4,047,365 | 9/1977 | Suggs | 56/27.5 |
| 4,073,373 | 2/1978 | Crowley et al. | 198/421 |
| 4,073,378 | 2/1978 | Jordan et al. | 198/627 |
| 4,303,364 | 12/1981 | Pinkham | 56/27.5 |
| 4,379,669 | 4/1983 | Wilson | 56/27.5 |

FOREIGN PATENT DOCUMENTS 751105 1/1967 Canada .

Primary Examiner—Gene Mancene
Assistant Examiner—David I. Tarnoff
Attorney, Agent, or Firm—Banner, Birch, McKie & Beckett

[57] ABSTRACT

A tobacco harvester discharge system is provided for uniformly distributing tobacco leaves into a tobacco bin. A set of rolls positioned over the discharge intercepts a substantial portion of the discharged tobacco leaves and directs them radially outward over the width of the bin. A fan located below the discharge blows air under the discharged tobacco leaves to extend the trajectory of the leaves over the length of the bin by a distance roughly proportional to the flow rate of air from the fan from time to time. The flow rate is controlled in a predetermined pattern to obtain uniform distribution of the discharged leaves over the bin.

20 Claims, 3 Drawing Figures

U.S. Patent  Jul. 23, 1985  Sheet 1 of 2  4,530,203
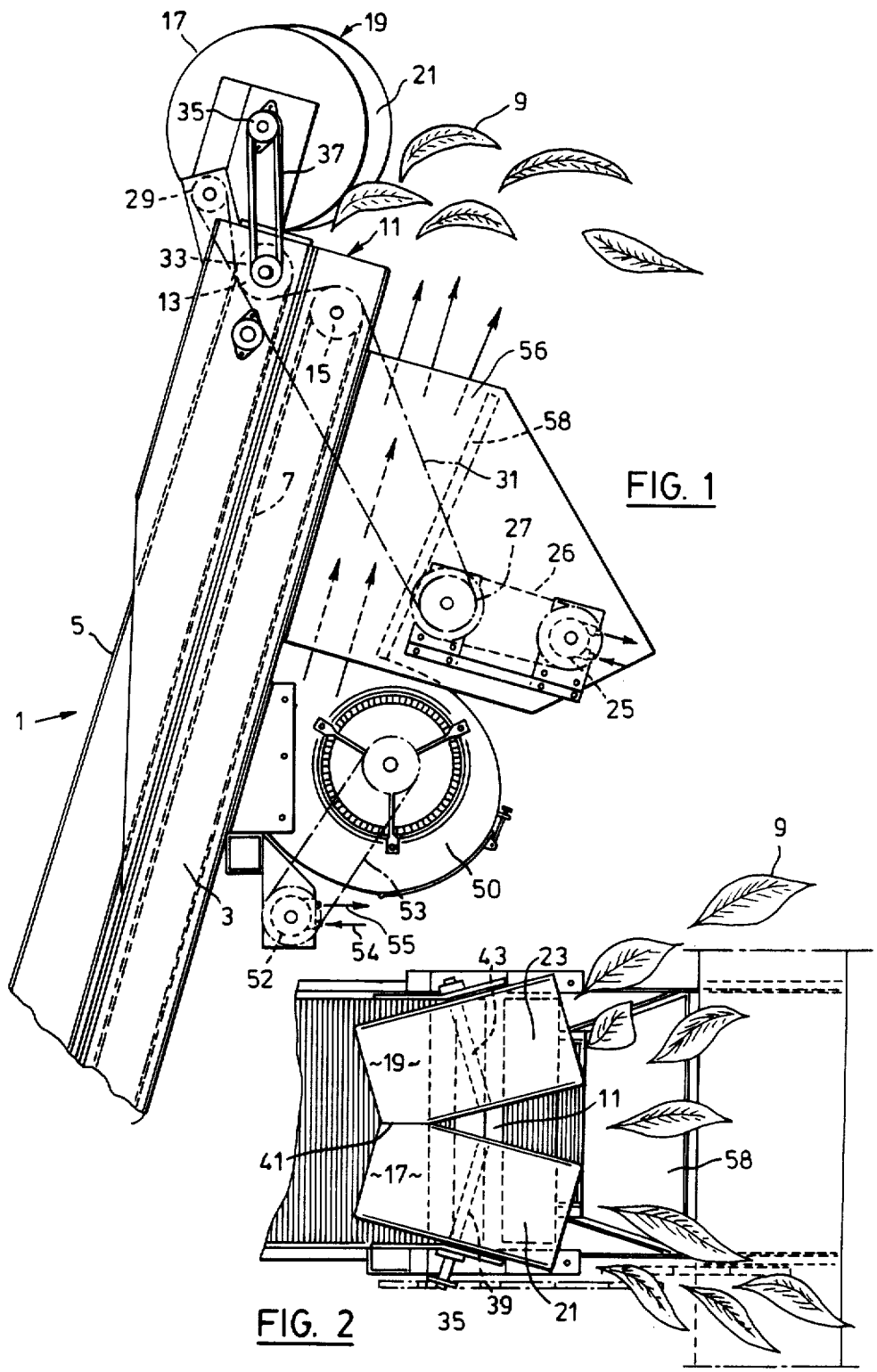

LEAF DISTRIBUTION MEANS

FIELD OF THE INVENTION

This invention relates to an improvement in a tobacco harvester or the like, particularly to leaf distribution means at the discharge end of a harvester to permit uniform distribution of the discharged leaves into a receptacle or container adapted to receive the harvester discharge.

BACKGROUND OF THE INVENTION

Over the past 20 years, revolutionary changes have occurred in the method and apparatus used for harvesting and curing tobacco. These changes have stemmed largely from the development of bulk curing techniques for curing tobacco.

Essentially the bulk curing method involves packing large quantities of tobacco leaves together in a face to face relationship in a heated, forced air recirculation kiln or barn. The leaves are placed so that their surfaces lie in a vertical plane and the heated air is forced upwards through the bulk pack so as to cure all of the tobacco within. An example of bulk curing methods is disclosed in Hassler, Canadian Patent No. 751,105.

Various methods and means were developed for making bulk packs and for simplifying and mechanizing tobacco harvesting and handling operations. Initially bulk packing of the tobacco leaves was accomplished by piercing the leaves onto a rack of tynes. An example of such a tobacco rack is disclosed in U.S. Pat. No. 3,143,370 to T. J. Danford et al. Harvesters were adapted to this type of rack, for example, see Long U.S. Pat. No. 3,834,137. Loading and unloading mechanisms for bulk packed tobacco were developed, see Green et al, U.S. Pat. No. 4,016,985 as well as trailers for transporting the bulk packed tobacco, see Long U.S. Pat. No. 3,095,230.

One of the important steps towards the simplification and mechanization of tobacco harvesting and curing was the development of methods of bulk packing and curing tobacco in large bins. An example of a tobacco container or bin and the related method of curing is disclosed in Long U.S. Pat. No. 3,935,959. In essence the concept is that the tobacco leaves are distributed into a bin with the leaf faces horizontal but otherwise randomly oriented until the bin is filled. Then the bin is closed and the tobacco leaves are pierced through vertically by retaining rods. The bin is then turned over on its side so that the leaf faces are vertical. The formation of the bulk pack is maintained by the now horizontal retaining rods. The bin in this position with other bins, is then placed in a forced air recirculation kiln. The bottom and top of the bin are usually perforated or open to permit the circulation of curing air through the bulk packed tobacco.

The development of containers for bulk curing led to the development of harvesters adapted to discharge the tobacco leaves directly into the bins or containers. When a bin was filled it could be replaced by another bin and taken to a curing kiln. Examples of harvesters of this type are found in Long U.S. Pat. No. 3,946,542 and Johnson, U.S. Pat. No. 3,885,376. However, as pointed out in Suggs, U.S. Pat. No. 4,047,365 a harvester discharge will tend to form a cone shaped pile in a container unless some leaf distribution means is provided. The cone shaped pile is unacceptable for the curing step because non-uniform distribution tends to permit air leakage through the less dense parts of the bulk pack and to deprive the more densely packed portions. Suggs U.S. Pat. No. 4,047,365, and Johnson U.S. Pat. No. 3,885,376 both provide mechanical means for obtaining an even distribution of leaves.

Another problem is discharging leaves from a harvester, where the discharge means includes a conveyor belt, is that sometimes leaves tend to stick to the belt and are not discharged properly. This problem was dealt with by using scavaging rollers to scrape under the discharge end of the conveyor belt in Mitchell, U.S. Pat. No. 4,037,391.

OBJECTS

It is an object of this invention to provide a novel means for obtaining a uniform distribution of leaves discharged from a harvester into a container.

It is an object of this invention to provide an adjustable leaf distribution means.

It is an object of this invention to provide a leaf distribution means that permits leaves to float into a container so as to land with the leaf surfaces horizontal in a face to face relationship.

It is an object of this invention to provide a novel means to lift leaves off a discharge conveyor belt.

SUMMARY OF THE INVENTION

The invention is directed to an improvement in a harvester having a discharge means adapted to discharge leaves into a container. The improvement comprises a set of rolls positioned over the discharge means positioned to intercept a substantial portion of the discharged leaves, the rolls being angled with respect to each other to direct the leaves radially outward from the discharge means over the width of the container; in combination with a fan means located below the discharge means and before the container being adapted to blow air under the discharged leaves to extend the trajectory of the leaves over the length of the container by a distance roughly proportional to the flowrate of air from time to time and a control means adapted to control the flowrate of air from time to time in a predetermined pattern to obtain uniform distribution of the discharged leaves over the container.

In this description the width of the container is the distance between its sides transverse to the direction of discharge. The forward direction means in the direction of the container from the discharge means and the rearward direction is the opposite direction.

The air blowing under the leaves tends to float the leaves into the container. Accordingly, as the container fills, the leaves will be in a face to face relationship over one another horizontally aligned. Therefore when the container is full it is in a condition to be pierced with retaining rods, righted on its side and placed in a curing kiln.

Where the discharge means of the harvester includes a discharge conveyor means adapted to discharge leaves from a discharge point where the conveyor means rotates and reverses direction, the set of rolls is located slightly above the discharge point to intercept a substantial portion of discharged leaves on the circumferential surfaces of the rolls. Such a conveyor discharge means sometimes comprises a double conveyor belt system where the two belts move upward along a track parallel and face to face with the leaves pressed between them. At the discharge point the conveyor belts rotate away from one another and reverse direction to return to pick up more leaves. Generally the leaves are discharged upwards and forwards from the point of discharge. In this situation the rolls are placed slightly above the point of discharge with the center of the rolls set back slightly from the point of discharge so that the discharged leaves intercept the rolls on their lower, forward circumferential surfaces. The tangential motion of these surfaces will be generally upwards and forwards so as to direct the leaves towards the container. Since the rolls are angled apart towards the sides of the container the leaves are directed and scattered over a sector bounded by the width of the container. The undercurrent of air from the fan distributes them over the length of the container as the flowrate of air is varied by the control means.

The air blowing under the leaves has the additional effect of lifting any leaves that might otherwise stick to the conveyor as it reverses direction at the discharge point.

It is preferred that the rolls be fabricated from a soft material such as soft polyurethane foam. It will be appreciated that the set of rolls might comprise any number of individual rolls. For example, a single soft polyurethane roll might be bent in a curve so that its rearward face was squeezed smaller than the forward face. Then upon rotation of the roll the lower circumferential surface would spread apart as it passed the point of interception with the discharged leaves thereby directing and scattering the leaves over the desired sector. It would also be possible to use three or more rolls all angled with respect to one another to achieve the desired scattering. However, it is preferred that the set of rolls comprise only two rolls of soft polyurethane foam. The rolls are positioned so that the rearward portion of the rolls press together while the forward portions of the rolls. It is preferred that one roll is driven by external means and that the friction between the two rolls at the point where they press together cause the motion to be transferred to rotate the second roll. In this manner it is possible to synchronize the rotation of the rolls.

The circumferential surface of the rolls may be flat or curved over its width. It is preferred presently that this surface be flat over the width. The fan means may be of any of a number of different types available on the market and similarly the means for controlling the flowrate of air from the fan to the leaves may be selected from any of the conventional means available to one skilled in the art. It is preferred, however, that a variable speed fan be used in conjunction with a control means adapted to vary the speed of the fan from time to time in a predetermined manner. The flowrate of air may be controlled by controlling the fan speed.

Another feature of the preferred embodiment of this invention is that the air from the fan is conveyed to the leaves through a duct. The duct may be adapted with means to expand or contract its shape to direct the flow of air over a greater or lesser area of the leaves being discharged. As will become more apparent in the detailed description of the embodiment illustrated the duct may be adjustable by having one side of the duct moveable from one fixed position to another. This permits an operator to select the desired duct size and direction to achieve the type of trajectory alteration most appropriate for the particular leaves being harvested. It will be appreciated by those skilled in the art that adjustments of the duct may be accomplished by numerous other mechanical equivalents of what is described herein.

In operation in the field it will usually be necessary to provide hooding or shrouding to prevent ambient air from interferring with the leaf distribution. It has been found that conventional hooding techniques are satisfactory for use in conjunction with this improvement, however, it is important that at least the top of the hood be a type of open mesh to permit the air from the fan to escape. Otherwise the air will swirl about within the hooding and cause the leaves to bank up against the sides.

DESCRIPTION OF THE FIGURES

In the figures which illustrate the preferred embodiment of the invention:

FIG. 1 is a side view of the discharge end of a tobacco harvester showing the improvement of this invention.

FIG. 2 is a plan view of the discharge end of a tobacco harvester showing the improvement of this invention.

As illustrated in FIG. 1, a tobacco harvester discharge system (1) generally comprises a supporting framework (3) in which are mounted two conveyor belts (5) and (7) which move up and down the framework in parallel relationship. The belts are arranged to face each other so that tobacco leaves (9) collected by the harvester may be carried up the discharge system (1) between the belts (5) and (7) to a discharge point (11) where the belts end their upward travel rotate around pulleys (13) and (15) to reverse direction and return to collect more leaves. The tobacco leaves (9) are directed upward from the discharge point (11) so that a substantial portion of the leaves (9) intercept the rolls (17) and (19). Some of the leaves may slip out between the rolls from the discharge point (11) and proceed directly out towards the container (not shown).

As illustrated in FIG. 1 the leaves (9) that intercept the rolls (17) and (19) do so at a location on the lower, forward (ie. towards the container) circumferential surfaces (21) of the rolls. Roll (17) is driven, as shown in FIG. 1, by a motor (25), connected to reduction pully (27) by belt (26). Pulleys (13), (15) and (29) are driven by belt (31) from reduction pulley (27). Reduction pulley (33) mounted on pulley (13) drives pulley (35) by means of belt (37). As shown in FIG. (2), pulley (35) is connected to the axle (39) of roll (17). Accordingly, the motor (25) drives both conveyor belts (5) and (7) and the roll (17). The rearward portions of rolls (17) and (19) are squeezed together at a point (41). Roll (19) which is mounted to rotate freely on axle (43) is therefore driven by roll (17) and is synchronized therewith.

Figure 3:
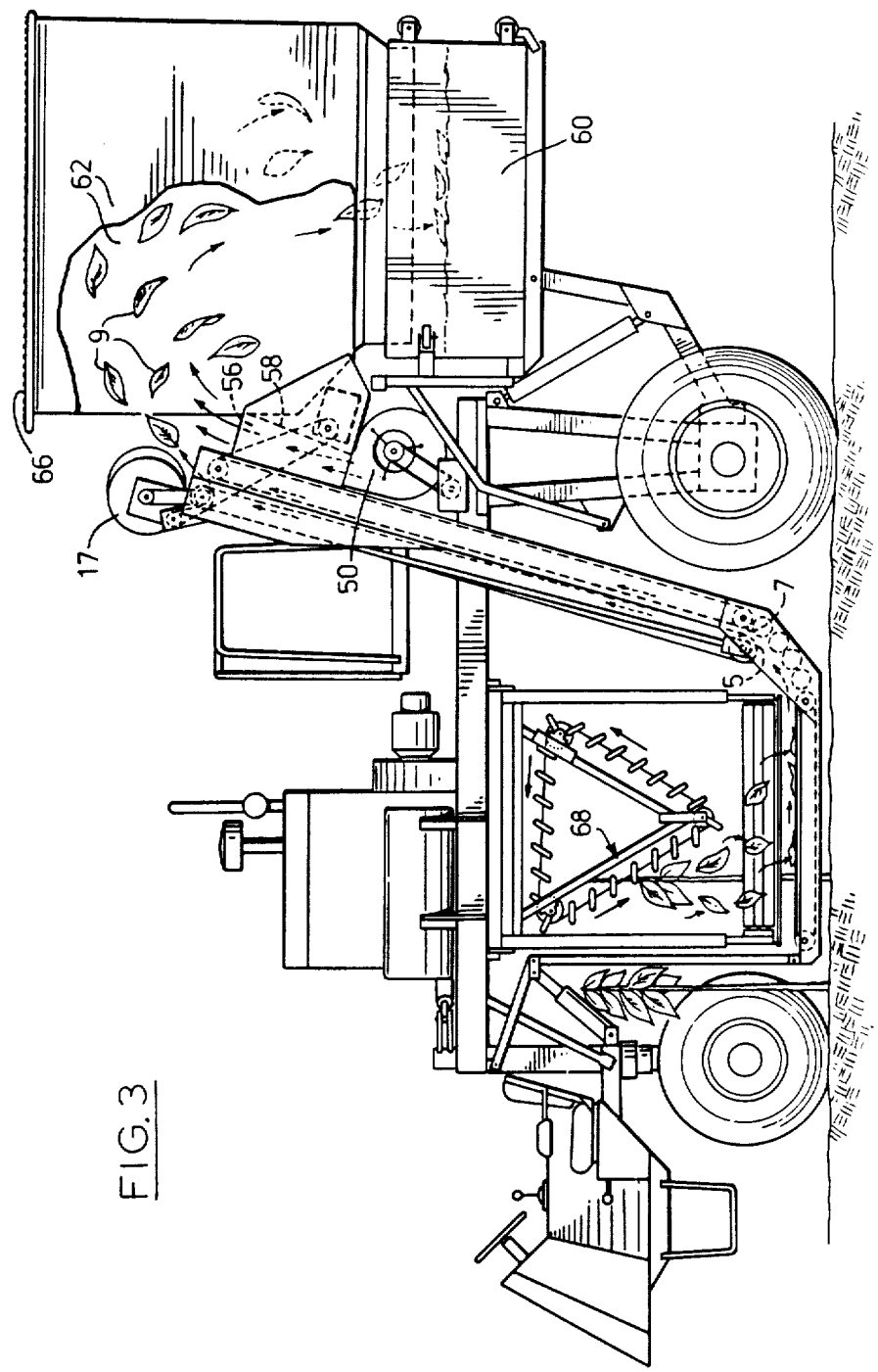
FIG. 3 is a side view of the harvester having the improvement of this invention.

The fan means and duct means of this invention are shown in FIG. 1 attached to the underside of framework (3) of the discharge means (1). A squirrel cage fan (50) is driven by a variable speed motor (52) by means of belt (53). Both motors (25) and (52) are hydraulic motors, however it will be apparent to those skilled in the art that electric or other types of conventional motors would serve as well. The input (54) to the motor (52) which controls its speed is varied in a sinusoidal manner by a control means (55). The control means may consist of an electric motor which through linkage opens and closes a valve in a sinusoidual manner thereby varying the feed input (54) to the motor (52). Accordingly the fan speed and the flowrate of air upward to the leaves (9) varies in conformance with the desired pattern.

The duct (56) is attached to the framework (3) of the discharge means (1) immediately above the fan (50) to convey air from the fan (50) to the leaves (9). The position of the forward wall (58) of the duct (56) is adjustable so that the mouth of the duct (56) may be expanded or contracted as desired to obtain best results for the particular tobacco leaves being harvested. In the preferred embodiment shown the wall (58) is bolted in place, and is made adjustable by having a number of bolt holes available in various positions. The desired position of the wall (58) is preselected before operation of the harvester and the wall (58) is bolted in place. It will be apparent to those skilled in the art, however, that it is possible to make the wall (58) adjustable continuously even during operation of the harvester by means of a slideable linkage driven by manual, hydraulic or electrical means.

In operation of the improvement of this invention, the wall (58) of the duct (56) is positioned to create the most desirable cross-sectional area. The most desireable cross-sectional area will be decided on the basis of prior experience or emperical experiment with the type of leaves being harvested and other conditions. The pattern for the signal (54) to control the motor (52) will also be selected and the control means (55) will be appropriately pre-programmed. An empty container (60) will be placed in position to receive the discharge of leaves (9) (See FIG. 3). Shrouding (62) is provided to shield the container from environmental conditions. The shrouding (62) has an open or mesh top (66) to permit air from the fan (50) to escape upwards. Motors (25) and (52) are started to drive the conveyor belts (5) and (7), rolls (17) and (19) and fan (50). The harvester then may begin the harvesting process.

As the defoliators (68) of the harvester collect leaves and pass then on to the conveyor belts (5) and (7), the leaves (9) are carried upward and forward to a discharge point (11) where the leaves (9) are flung upward and forward by inertial forces as the conveyor belts (5) and (7) turn and reverse direction about pulleys (13) and (15). Most of the leaves continue upward to intercept the lower forward circumferential surfaces (21) and (23) of rolls (17) and (19). Some of the leaves (9) continue between the rolls (17) and (19). The rolls (17) and (19) are driven by means previously described in a counterclockwise direction in FIG. 1 and are angled apart in the forward direction. Consequently the leaves that intercept the wide circumferential surfaces (21) and (23) are directed outwards in the forward direction over a sector determined by the angle of the rolls. The location of any particular leaf (9) in that sector will depend in part upon where the leaf (9) intercepts the rolls (17) and (19) which are angled so that the leaves intecepting the outermost part of the width of the container while those intercepting at locations more central will be directed to more central locations of the container. Leaves missing the rolls (17) and (19) will continue towards the center of the container.

Once the leaves (9) are directed forward from the discharge point (11) and the point of interception with the rolls (17) and (19) they are floated forward towards the container under the influence of the air from the variable speed fan (50) passing upwards through duct (56). As the speed of the fan and the resultant flowrate of air is varied from high to low in accordance with the selected pattern the trajectory of the leaves floating on the air is increased or decreased in a rough harmony with the flowrate of air. Consequently the leaves (9) are scattered from the front to the back of the container as they drift in over the width of the container. In this manner the leaves are distributed about the whole container until the container is full.

The flowrate of air upwards past conveyor (7) at the point where it rolls over pulley (15) and reverses direction may also have a scavaging effect to prevent leaves from sticking to conveyor (7) and returning down to the bottom again.

It will be apparent to those skilled in the art that many modifications or changes may be made to the constitutent elements of this improvement combination without departing from the scope of this invention. It will also be apparent that this improvement may be useful for the harvesting of crops other than tobacco.

The embodiments of the invention in which an exclusive property or privilege is claimed are defined as follows:

1. In a harvester having a discharge means adapted to discharge leaves into a container the improvement comprising a set of rolls located over the discharge means positioned to intercept a substantial portion of leaves discharged, the rolls being angled with respect to each other to direct the leaves radially outward from the discharge means over the width of the container; in combination with a fan means located below the discharge means and before the container being adapted to blow air under the discharged leaves to extend the trajectory of the leaves over the length of the container by a distance roughly proportional to the flowrate of air from the fan means from time to time and a control means adapted to control the flowrate of air from time to time in a predetermined pattern to control the trajectory of the leaves to obtain uniform distribution of the discharged leaves over the length and width of the container.

2. In a harvester having a conveyor belt discharge means adapted to discharge leaves from a discharge point into a container, the improvement comprising a set of rolls having circumferential surfaces, said rolls being positioned slightly above the discharge point to intercept a substantial portion of the discharged leaves on said circumferential surfaces, said set of rolls being adapted to rotate so that the tangential motion of said circumferential surfaces where the leaves are intercepted is generally towards the container and said rolls being angled with respect to one another to direct the discharged leaves radially outward from the discharge point over a sector bounded by the width of the container; in combination with a fan means adapted to blow air under the discharged leaves to extend the trajectory of the leaves over the length of the container by a distance roughly proportional to the flowrate of air from time to time and a control means adapted to control the flowrate of air from time to time in a predetermined pattern to obtain uniform distribution of the discharged leaves over the length and width of the container.

3. In a harvester having a conveyor discharge means in which two belts are adapted to move upwards and forwards parallel to one another and face to face with leaves pressed between them to a point of discharge where the belts turn away from one another and reverse direction thereby directing the leaves upwards and forwards towards a container below, the improvement comprising a set of rolls placed slightly above and rearward of the discharge point at a position to permit a substantial portion of the discharged leaves to intercept the lower forward circumferential surfaces of said rolls, said rolls being adapted to rotate so that the tangential motion of their circumferential surfaces where the leaves intercept the rolls is generally upwards and forwards towards the container, said rolls being angled apart in the forward direction to direct the leaves radially forward from the discharge point over a sector bounded by the width of the container, in combination with a fan means adapted to blow air under the discharged leaves to extend the trajectory of the leaves over the length of the container by a distance roughly proportional to the flowrate of air from time to time and a control means adapted to control the flowrate of air from time to time in a predetermined pattern to obtain uniform distribution of the discharged leaves over the length and width of the container.

4. The improvement of claims 1, 2 or 3 in which the set of rolls comprises a plurality of rolls of a soft material.

5. The improvement of claims 1, 2 or 3 in which the set of rolls comprises a plurality of rolls of polyurethane foam.

6. The improvement of claims 1, 2 or 3 in which the set of rolls comprises two rolls of soft polyurethane foam.

7. The improvement of claims 1, 2 or 3 in which the set of rolls comprises two rolls of soft polyurethane foam having their rearward portions pressed together.

8. The improvement of claims 1, 2 or 3 in which the set of rolls comprises two rolls of soft polyurethane foam having their rearward portions pressed together and their forward portions angled apart, one of said rolls being driven and transferring motion to the other of said rolls by means of friction where the two rolls press together to synchronize the rotation of the two rolls.

9. The improvement in claims 1, 2 or 3 where the harvester is a tobacco harvester and the leaves are tobacco leaves and the set of rolls comprises a plurality of rolls of a soft material.

10. The improvement in claims 1, 2 or 3 where the harvester is a tobacco harvester and the leaves are tobacco leaves and the set of rolls comprises a plurality of rolls of soft polyurethane foam.

11. The improvement in claims 1, 2 or 3 where the fan means communicates with a duct means adapted to convey air from the fan means to the discharged leaves.

12. The improvement in claims 1, 2 or 3, where the harvester is a tobacco harvester and the leaves are tobacco leaves and the fan means communicates with a duct means adapted to convey air from the fan means to the discharged tobacco leaves.

13. The improvement of claims 1, 2 or 3 where the fan means communicates with a duct means to convey the air from the fan to the discharged leaves where the duct means is adjustable to permit expansion or contraction of the duct to direct the air from the fan means over a greater or lesser area of the discharged leaves.

14. In a tobacco harvester having a discharge means adapted to discharge tobacco leaves into a container the improvement comprising a set of rolls located at a discharge point where the tobacco leaves emerge from the discharge means, said rolls being positioned to intercept a substantial portion of the discharged tobacco leaves at an area of interception on lower forward circumferential surfaces of said rolls, and said rolls being rotated in a direction which causes the tangential motion of the circumferential surfaces of said rolls at the area of interception to be generally towards the container, said rolls being angled with respect to one another to direct the discharged tobacco leaves radially outward from the discharge means over a sector bounded by the width of the container, in combination with a fan means in communication with duct means being adapted to blow air under the discharged tobacco leaves to extend the trajectory of the leaves over the length of the container by a distance roughly proportional to the flowrate of air from the fan means from time to time and a control means adapted to control the flowrate of air from time to time in a predetermined pattern to obtain uniform distribution of the discharged leaves over the length and width of the container.

15. The improvement of claim 14 where the fan means is a variable speed fan and the control means controls the speed of the fan from time to time.

16. The improvement of claim 14 where the duct means is adjustable to permit expansion or contraction of the duct to direct the air from the fan means over a greater or lesser area, respectively, of the discharged tobacco leaves.

17. The improvement of claim 14, where the set of rolls comprises a plurality of rolls of soft material.

18. The improvement of claim 14, where the set of rolls comprises a plurality of rolls of soft polyurethane foam.

19. The improvement of claim 14 where the set of rolls comprises a pair of rolls of soft material having their rearward portions pressed together and their forward portions angled apart, one of said rolls being driven and transferring motion to the other of said rolls by means of friction where the two rolls press together to synchronize the rotation of the two rolls.

20. The improvement of claims 15, 16 or 19 where the discharge means and the container are covered by a shrouding means adapted to prevent environmental winds from affecting the operation of the discharge means, wherein said shrouding means has top portion adapted to permit air from the fan means to escape after it has passed the tobacco leaves.

* * * * *